United States Patent
Shibao

(10) Patent No.: US 6,661,527 B1
(45) Date of Patent: Dec. 9, 2003

(54) IMAGE INPUT/OUTPUT APPARATUS, IMAGE INPUT/OUTPUT METHOD AND IMAGE PROCESSING SYSTEM

(75) Inventor: Kouki Shibao, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,187

(22) Filed: Dec. 2, 1999

(30) Foreign Application Priority Data

Dec. 4, 1998 (JP) .......................................... 10-345453

(51) Int. Cl.$^7$ ................................................ G06F 15/00
(52) U.S. Cl. ...................................... 358/1.13; 358/1.17
(58) Field of Search ................................ 358/1.1, 1.13, 358/1.18, 1.15, 1.16, 1.17, 1.14, 1.6, 403, 444, 445, 450, 453; 345/530, 545, 546, 502, 520

(56) References Cited

U.S. PATENT DOCUMENTS 5,534,956 A * 7/1996 Iwashita et al. ............ 396/311
6,353,483 B1 * 3/2002 Laverty et al. ............ 358/1.15

* cited by examiner

Primary Examiner—Arthur G. Evans
(74) Attorney, Agent, or Firm—Fitzpatrick, Cella, Harper & Scinto

(57) ABSTRACT

In an image input/output apparatus which stores image data input from a reader unit into a hard disk and outputs the stored image data to a printer unit, an operation unit for setting an image processing content to be performed by the printer unit when the image data is input is disposed, the image processing content capable of being set by the operation unit is restricted according to the detection output of a structure of the printer unit, and it is previously selected whether or not the setting restriction of the image processing content is to be performed.

28 Claims, 11 Drawing Sheets

IMAGE INPUT/OUTPUT APPARATUS, IMAGE INPUT/OUTPUT METHOD AND IMAGE PROCESSING SYSTEM

BACKGROUND OF THE INVENTION

1. Field of the Invention

The present invention relates to an image input/output apparatus, an image input/output method and an image processing system which input and output various image data through a storage medium.

2. Related Background Art

In connection with digitization of a copying machine in recent years, a multifunctional machine having plural functions has been put to practical use. In this machine, facsimile transmission and reception are performed by using a scanner and a printer of the copying machine, and PDL (page description language) data from a computer or the like is expanded (or decompressed) and printed out. Such the multifunctional machine is structured to be able to operate not only for a single function such as a copy function, a facsimile function, a PDL printing function or the like, but also for plural functions. For example, the multifunctional machine can operate when a PDL expanded image is facsimile transmitted. Further, it is structured that, if the multifunctional machine is connected to various apparatuses such as the computer and the like through a LAN (local area network), also such the computer and the like can use the functions of the multifunctional machine.

Further, in such the multifunctional machine, by sharing a control program of a printer part with the copy function, the PDL printing function, a facsimile printing function and the like, and by sharing a control program of a reader part with the copy function, a facsimile reading function, a scanning function and the like, a capacity of the control programs for realizing these functions can be reduced, whereby it is possible to economically and simply realize a desired function.

Further, such the multifunctional machine includes an image storage unit such as a large-capacity hard disk, a semiconductor memory or the like for storing image data. Thus, by inputting a read image transferred from a scanner, the PDL expanded image, a facsimile-received document and the like into the image storage unit, and by repeatedly outputting or facsimile-transmitting the stored images and documents to a printer, it is possible to perform effective image processing.

In the multifunctional machine which includes such the image storage unit, an image data input operation to store the read image from the scanner, the PDL expanded image, the facsimile-received document or the like into this image storage unit and an image data output operation to repeatedly output or facsimile-transmit the stored image and/or document to the printer can be performed at different time. Namely, it is possible to store the image data into the image storage unit and thereafter read and output the stored data at arbitrary time.

However, after the input image data is stored into the image storage unit, if the body structure of the multifunctional machine is changed because option equipment is installed in or released from the multifunctional machine before the image data is output, it is impossible to take adjustment between the body structure for the image processing at the image data input time and the latest body structure, whereby an error state that desired image processing can not be performed occurs. As a result, it is possible to cause the problem that the image output stops at that time and thus obstacle comes to following image output operations.

Further, at the time when the image data is input, only the image processing function which is practicable by the multifunctional machine at that time can be set. In other words, even if option equipment which has a function which is practicable after the image data is input is added, the image processing using such the function can not be set at the image data input time. Therefore, for example, even if a user foresees the change of the body structure of the multifunctional machine beforehand and thus wishes to submit a job which is supposed to be practicable after the body structure of the machine is changed, he can not submit (or input) such the job.

SUMMARY OF THE INVENTION

An object of the present invention is to enable, even if a body structure of a multifunctional machine is changed because option equipment is installed in or released from the machine after input image data is stored into an image storage unit and before the stored image data is output, the multifunctional machine to output the image data if necessary.

Another object of the present invention is to enable, as to a function which is practicable by adding option equipment or the like after image data is input, a multifunctional machine to set image processing using such the function at the time when the image data is input.

Namely, the present invention is to provide an image input/output apparatus comprising:

input means for inputting image data from at least one image input unit;

storage means for storing the image data input by the input means;

output means for outputting the image data stored in the storage means to at least one image output unit;

setting means for setting an image processing content to be performed by the image output unit when the image data is input by the input means;

detection means for detecting a structure of the image output unit;

restriction means for restricting the image processing content capable of being set by the setting means, in accordance with the detection output of the detection means; and selection means for previously selecting whether or not the setting restriction of the image processing content is to be performed by the restriction means.

Further, the present invention is to provide an image input/output apparatus comprising:

input means for inputting image data from at least one image input unit;

storage means for storing the image data input by the input means;

output means for outputting the image data stored in the storage means to at least one image output unit;

setting means for setting an image processing content to be performed by the image output unit when the image data is input by the input means;

detection means for detecting a structure of the image output unit when the image data is output by the output means; and judgment means for judging whether the image processing content set by the setting means is practicable or nonpracticable, according to the detection output of the detection means, wherein, when it is judged by the judgment means that the image processing content set by the setting means is nonpracticable, the image input/output apparatus operates in a first mode to stop the image processing of the image processing content judged to be nonpracticable, and in a second mode to change the image processing content judged to be nonpracticable to another image processing content and then perform the image processing.

Further, the present invention is to provide an image input/output method for an image input/output apparatus which inputs image data from at least one image input unit, stores the input image data into storage means, and outputs the image data stored in the storage means to at least one image output unit, the method comprising:

a detection step of detecting a structure of the image output unit when the image data is input from the image input unit;

a setting step of setting an image processing content to be performed by the image output unit when the image data is input from the image input unit;

a restriction step of restricting the image processing content capable of being set in the setting step, in accordance with the detection output of the detection step; and a selection step of previously selecting whether or not the setting restriction of the image processing content is to be performed in the restriction step.

Further, the present invention is to provide an image input/output method for an image input/output apparatus which inputs image data from at least one image input unit, stores the input image data into storage means, and outputs the image data stored in the storage means to at least one image output unit, the method comprising:

a setting step of setting an image processing content to be performed by the image output unit when the image data is input from the image input unit;

a detection step of detecting a structure of the image output unit when the image data is output to the image output unit; and a judgment step of judging whether the image processing content set in the setting step is practicable or nonpracticable, according to the detection output of the detection step, wherein, when it is judged in the judgment step that the image processing content set in the setting step is nonpracticable, the image input/output apparatus operates in a first mode to stop the image processing of the image processing content judged to be nonpracticable, and in a second mode to change the image processing content judged to be nonpracticable to another image processing content and then perform the image processing.

Further, the present invention is to provide an image processing system which stores image data input from at least one image input means into storage means, and outputs the image data stored in the storage means to at least one image output means, the system comprising:

setting means for setting an image processing content to be performed by the image output means when the image data is input from the image input means;

detection means for detecting a structure of the image output means;

restriction means for restricting the image processing content capable of being set by the setting means, in accordance with the detection output of the detection means; and selection means for previously selecting whether or not the setting restriction of the image processing content is to be performed by the restriction means.

Further, the present invention is to provide an image processing system which stores image data input from at least one image input means into storage means, and outputs the image data stored in the storage means to at least one image output means, the system comprising:

setting means for setting an image processing content to be performed by the image output means when the image data is input from the input means;

detection means for detecting a structure of the image output means when the image data is output to the output means; and judgment means for judging whether the image processing content set by the setting means is practicable or nonpracticable, according to the detection output of the detection means, wherein, when it is judged by the judgment means that the image processing content set by the setting means is nonpracticable, the image processing system operates in a first mode to stop the image processing of the image processing content judged to be nonpracticable, and in a second mode to change the image processing content judged to be nonpracticable to another image processing content and then perform the image processing.

Other Objects and Features of the Present invention will become apparent from the following detailed description and the attached drawings.

DETAILED DESCRIPTION OF THE PREFERRED EMBODIMENT

Figure 1:
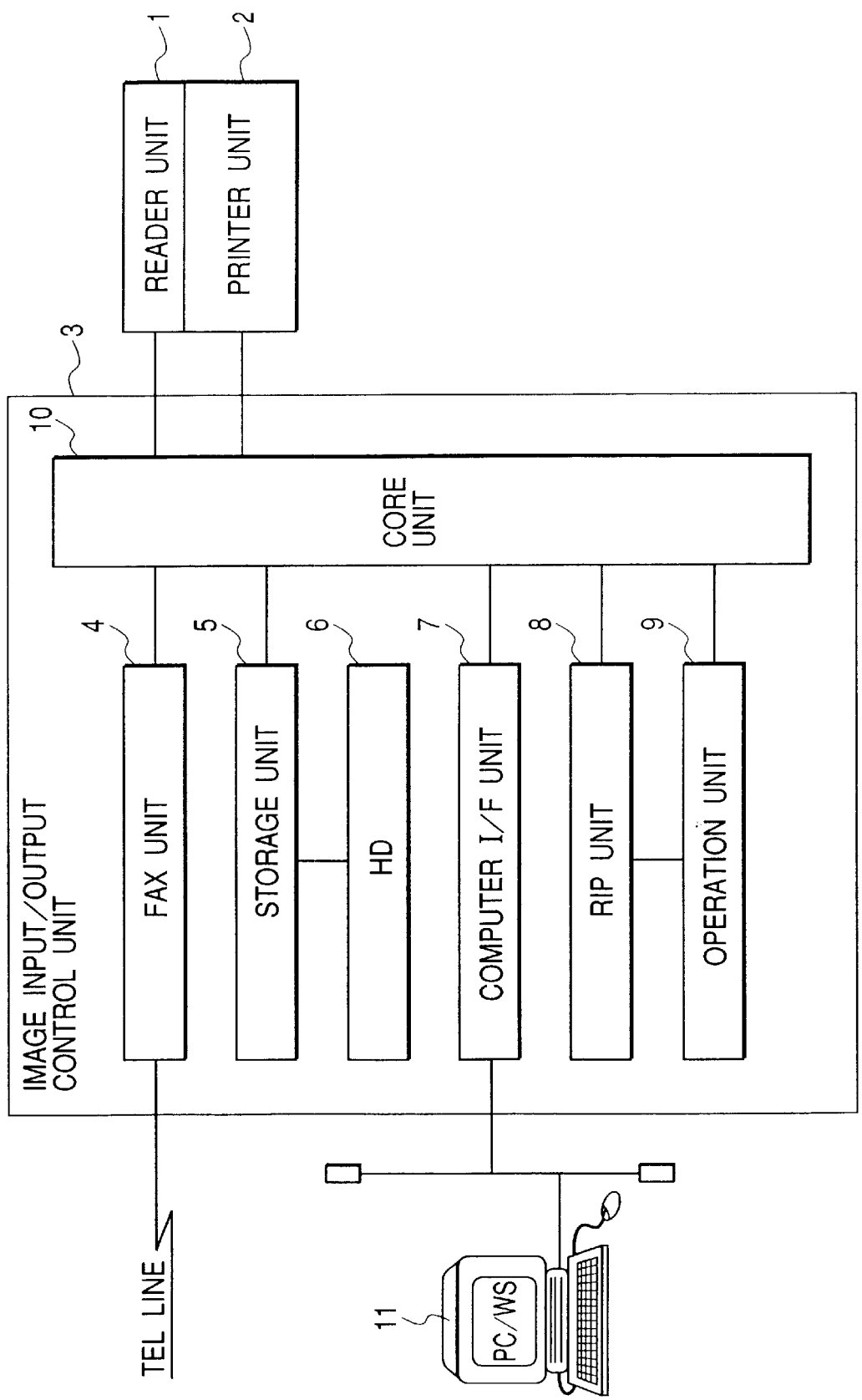
FIG. 1 is a block diagram showing an image input/output control apparatus according to the embodiment of the present invention.

FIG. 1 is a block diagram showing a structure of an image input/output control apparatus to which the present invention is applied.

In FIG. 1, a reader unit 1 photoelectrically reads an image on an original by a CCD image sensor or the like, and outputs image data corresponding to the original image to an image input/output control unit 3. A printer unit 2 such as a laser beam printer records an image corresponding to the image data transferred from the control unit 3, onto a recording sheet. The control unit 3 is connected to the reader unit 1 and the printer unit 2, and composed of a facsimile unit 4, a storage unit 5, a computer I/F (interface) unit 7, an RIP (raster image processor) unit 8, an operation unit 9, a core unit 10 and the like.

The facsimile unit 4 receives compressed image data through a telephone line, decompresses the received data, and transfers the decompressed image data to the core unit 10. Conversely, the facsimile unit 4 compresses the image data transferred from the core unit 10, and transmits the compressed data through the telephone line. The image data received or to be transmitted can be temporarily stored in an HD (hard disk) 6 connected to the storage unit 5.

Since the storage unit 5 is connected with the HD 6, the storage unit 5 compresses the image data transferred from the core unit 10 and then stores the compressed data into the HD 6 together with an ID (identification) number used to search the stored data. Further, the storage unit 5 searches the compressed image data stored in the HD 6, on the basis of code data transferred through the core unit 10. Then the storage unit 5 reads the searched image data, decompresses the read data, and transfers the decompressed data to the core unit 10. Since the HD 6 has a storage capacity of, e.g., 2 gigabytes, A4-size images corresponding to about 1000 pages can be stored in the HD 6 though it depends on their contents.

Further, the storage unit 5 detects whether or not the HD 6 is connected there and whether or not the HD 6 is out of order, by writing, reading and checking command/response and predetermined data through a hard disk interface.

The computer I/F unit 7 interfaces the core unit 10 with a PC/WS (personal computer or work station) 11. The I/F unit 7 may be connected to the PC/WS 11 by a one-to-one local interface or may be connected there by a network.

The RIP unit 8 expands or decompresses code data (PDL (page description language)) representing an image transferred from the PC/WS 11 into the image data recordable by the printer unit 2.

The operation unit 9 includes a touch panel display and hard keybuttons. The operation unit 9 is used to instruct and/or set various operations of the image input/output control apparatus through user interface.

Although the details of the core unit 10 will be described later, the core unit 10 controls data flows among the reader unit 1, the printer unit 2, the facsimile unit 4, the storage unit 5, the computer I/F unit 7, the RIP unit 8 and the operation unit 9.

Figure 2:
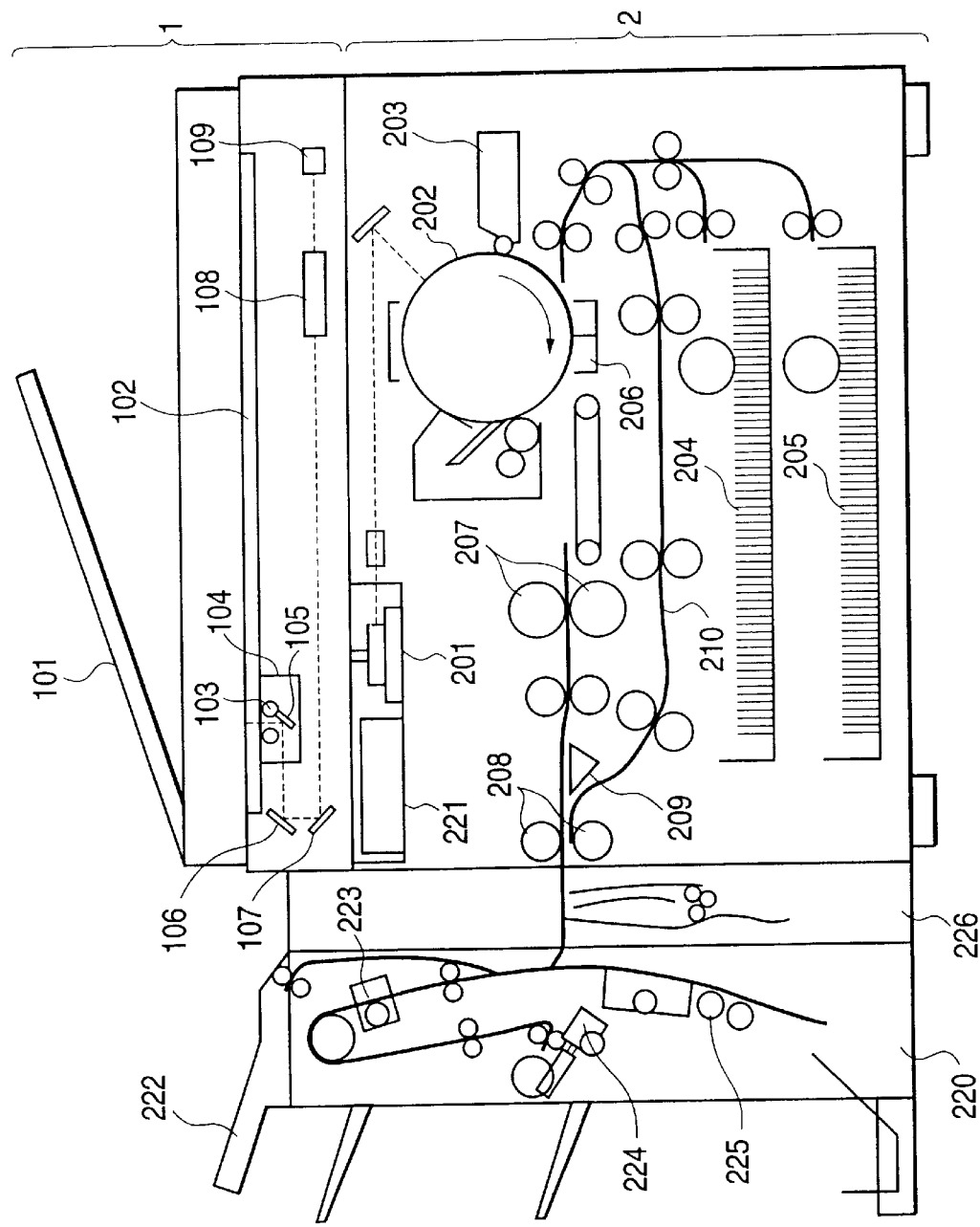
FIG. 2 is a sectional view showing a reader unit and a printer unit.

FIG. 2 is a sectional view showing the reader unit 1 and the printer unit 2. Plural originals are set by a user at a predetermined stacking position of an original feed unit 101 of the reader unit 1. The feed unit 101 feeds these original one by one from their first page in due order, onto a platen glass 102. After an original reading operation ends, the feed unit 101 discharges the original on the platen glass 102 to a predetermined discharge position. When the original is fed onto the platen glass 102, a lamp 103 is lit, and movement of a scanner unit 104 is started, whereby the original is exposed and scanned. Reflection light from the original at this time is guided into a CCD image sensor (simply referred as CCD hereinafter) 109 through mirrors 105, 106 and 107 and a lens 108. Thus, the image of the scanned original is photoelectrically converted and read by the CCD 109. Image data output from the CCD 109 is subjected to predetermined processing such as A/D (analog-to-digital) conversion, shading correction, desired editing processing and the like, and then the processed image data is transferred to the core unit 10 of the image input/output control unit 3.

A laser driver 221 of the printer unit 2 causes a laser beam generation unit 201 to generate a laser beam according to the image data output from the core unit 10 of the image input/output control unit 3. The generated laser beam is irradiated onto a photosensitive drum 202, and a latent image according to the laser beam is formed on the drum 202. Then a developer is adhered by a development unit 203 to the latent image portion of the photosensitive drum 202.

A recording sheet is fed from either a cassette 204 or a cassette 205 and carried to a transfer unit 206 at timing which is synchronous with start of the laser beam irradiation. Thus, the developer adhered on the photosensitive drum 202 is transferred onto the recording sheet. The recording sheet onto which the developer was transferred is carried to a fixing unit 207, and the developer is heated and pressed by the fixing unit 207, whereby the developer is fixed to the recording sheet. The recording sheet passed the fixing unit 207 is discharged outwardly. If two-face recording has been set, after the recording sheet subjected to one-face recording is carried up to the discharge rollers 208, a rotational direction of each roller 208 is reversed, and thus the sheet is guided to a sheet refeed carrying path 210 by a flapper 209. The recording sheet guided to the path 210 is again fed to the transfer unit 206 at the above-described timing, whereby image recording on the other face is performed.

Numeral 220 denotes a finisher which is installed as an option if necessary, and numeral 226 denotes a Z folding unit which is installed (or connected) between the printer unit 2 and the finisher 220 if necessary. When the Z folding unit 226 is being installed, if it is instructed by the user to perform Z folding processing, the recording sheet discharged from the discharge rollers 208 of the printer unit 2 is carried to the Z folding unit 226, whereby the recording sheet is subjected to the Z folding processing. It should be noted that the Z folding processing is the processing to valley-shape fold, e.g., an A3-size recording sheet in half and then mountain-shape fold the half of the valley-shape folded sheet. Thus, for example, it is possible to integrate the document including A4-size sheets and A3-size sheets into the document including only A4-size sheets and perform binding processing such as stapling or the like.

Further, when the finisher 220 is being installed, the recording sheet discharged by the discharge rollers 208 of the printer unit 2 is guided into the finisher 220. When the finisher 220 and the Z folding unit 226 are being installed, the recording sheet discharged by the Z folding unit 226 is guided into the finisher 220. In accordance with user's instructions, the finisher 220 sorts the plural discharged recording sheets by sheafing them, and staples the sorted sheets together by using a stapler 224. Further, a saddle stitcher 225 stitches the center of the sheaf of sheets and folds the stitched center in half, whereby the plural recording sheets are subjected to book binding processing. An inserter 222 is detachably installed on the finisher 220 and has an insertion aperture. When sheets not passed the printer unit 2 are combined with the sheets discharged from the printer unit 2 and the combined sheets are subjected to the book binding processing and the stapling, the insertion aperture is used to supply the sheets to be combined into the finisher 220. Thus, for example, it is possible to perform processing to bind a recording sheet previously subjected to printing, as the cover of the recording sheets discharged from the printer unit 2.

Figure 3:
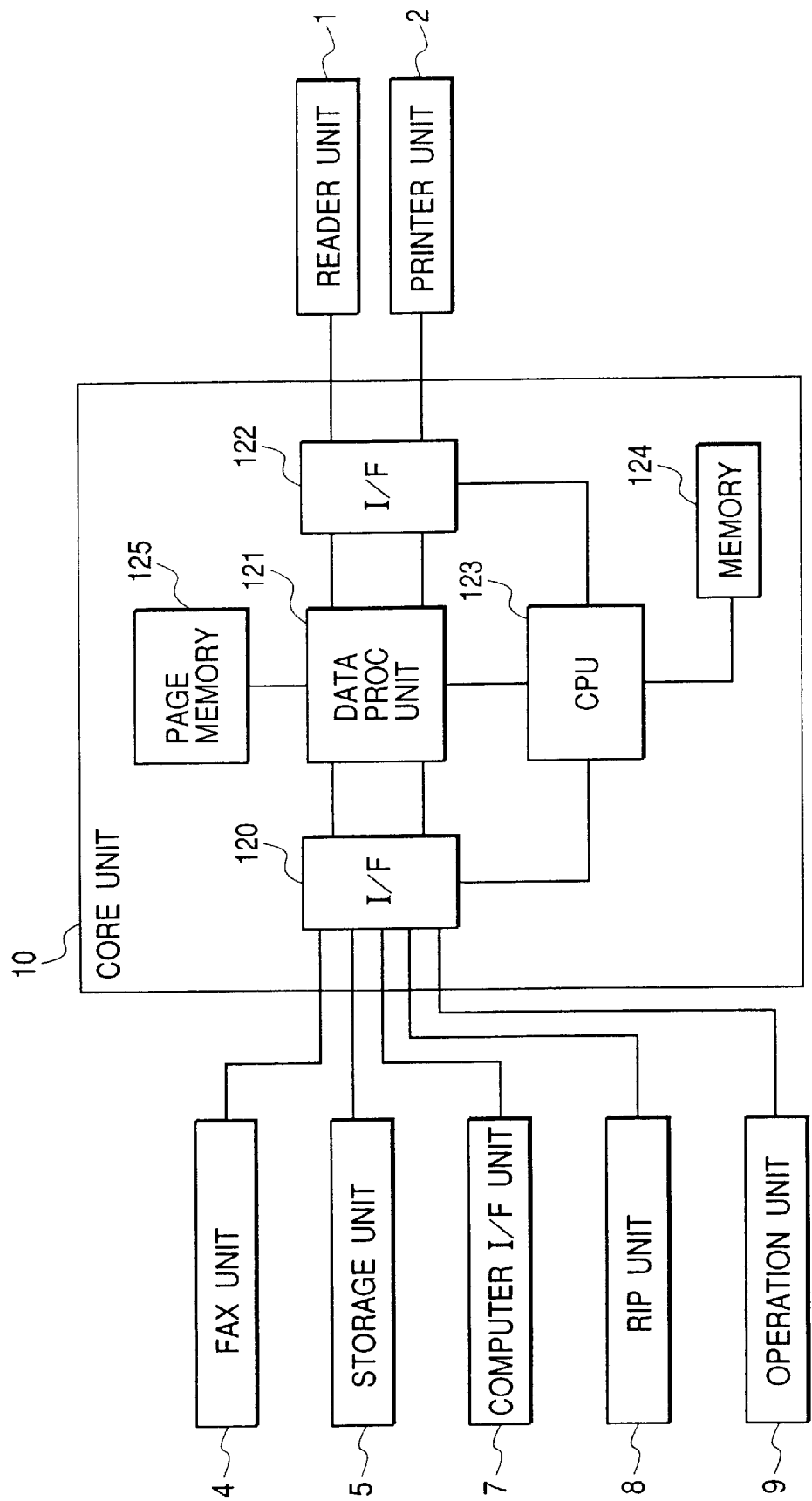
FIG. 3 is a block diagram showing a core unit.

FIG. 3 is a block diagram showing the core unit 10.

The image data from the reader unit 1 is transferred to a data processing unit 121 through an I/F (interface) 122. The processing unit 121 which performs image processing (e.g., image rotation processing, magnification change processing) and compression/decompression of the image data has a page memory 125 capable of storing image data corresponding to, e.g., images of A4/letter size and 4 pages. The image data transferred from the reader unit 1 to the data processing unit 121 is temporarily stored in the page memory 125, and then compressed and transferred to the storage unit 5 through an I/F 120.

The code data (PDL) representing the image input through the computer I/F unit 7 is transferred to the data processing unit 121 through the I/F 120, and further transferred to the RIP unit 8 to be expanded into the image data. The obtained image data is transferred to the processing unit 121, temporarily stored into the page memory 125, and then compressed and transferred to the storage unit 5.

The image data from the facsimile unit 4 is transferred to the data processing unit 121, temporarily stored into the page memory 125, and then compressed and further transferred to the storage unit 5.

After the image data from the storage unit 5 is transferred to the data processing unit 121, the image data is decompressed and temporarily stored into the page memory 125. Then the image data is transferred to the printer unit 2, the facsimile unit 4 and/or the computer I/F unit 7.

After various image data is input to the data processing unit 121 and temporarily stored into the page memory 125, it is possible by changing an internal selector to transfer the stored image data to the printer unit 2, the facsimile unit 4 and/or the computer I/F unit 7 before the stored data is transferred to the storage unit 5.

A CPU (central processing unit) 123 controls the above-described various operations in accordance with control programs stored in a memory 124 and control commands transferred from the operation unit 9. Also, the memory 124 is used as an working area of the CPU 123.

Thus, around the core unit 10, it is possible through the data processing unit 121 and the storage unit 5 to perform the processing in which various functions as to original image reading, image printing, image transmission, image reception, image storage, data input/output from/to a computer and the like are combined with others.

Figure 4:
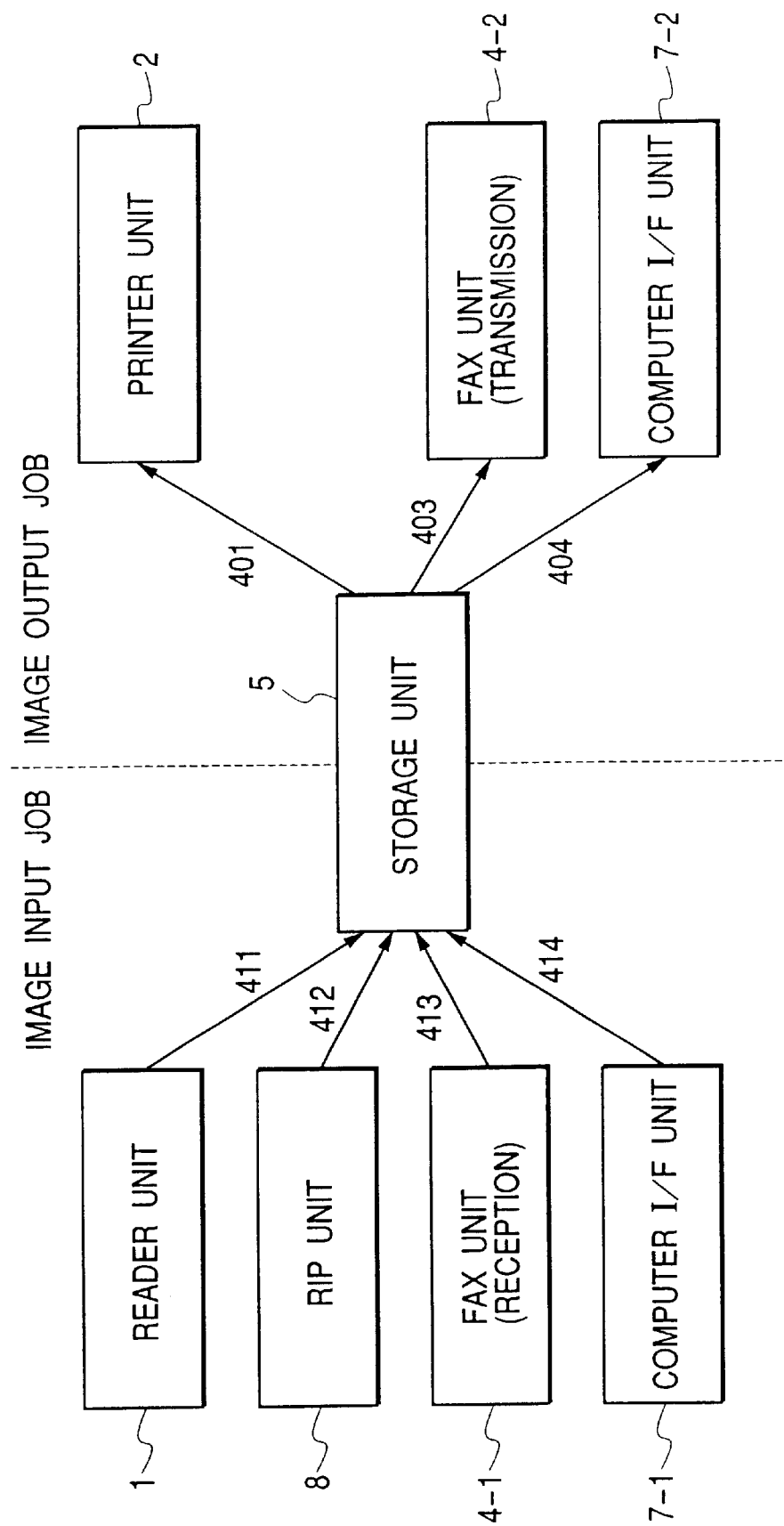
FIG. 4 is a block diagram showing an image input job and an image output job.

Next, job control performed by the CPU 123 of the core unit 10 in the image input/output control apparatus of the present embodiment will be explained with reference to FIG. 4. First, a case where the HD 6 normally operates will be explained by way of example. Incidentally, FIG. 4 logically shows unit of job control.

The unit of job control corresponds to a series of input and output processing for a group of the image data including the plural pages. Roughly, an image input job and an image output job are the jobs to be controlled by the job control of one unit.

The image input job includes an image input job 411 to sequentially record the image data read by the reader unit 1 into the storage unit 5, an image input job 412 to sequentially record the image data expanded or decompressed by the RIP unit 8 into the storage unit 5, an image input job 413 to sequentially record the image data received by a facsimile unit 4-1 into the storage unit 5, and an image input job 414 to sequentially record the image data input from a computer I/F unit 7-1 into the storage unit 5.

The image output job includes an image output job 401 to sequentially output the image data read from the storage unit 5 to the printer unit 2, an image output job 403 to sequentially output the image data read from the storage unit 5 to a facsimile unit 4-2, and an image output job 404 to sequentially output the image data read from the storage unit 5 to a computer I/F unit 7-2.

Figure 5:
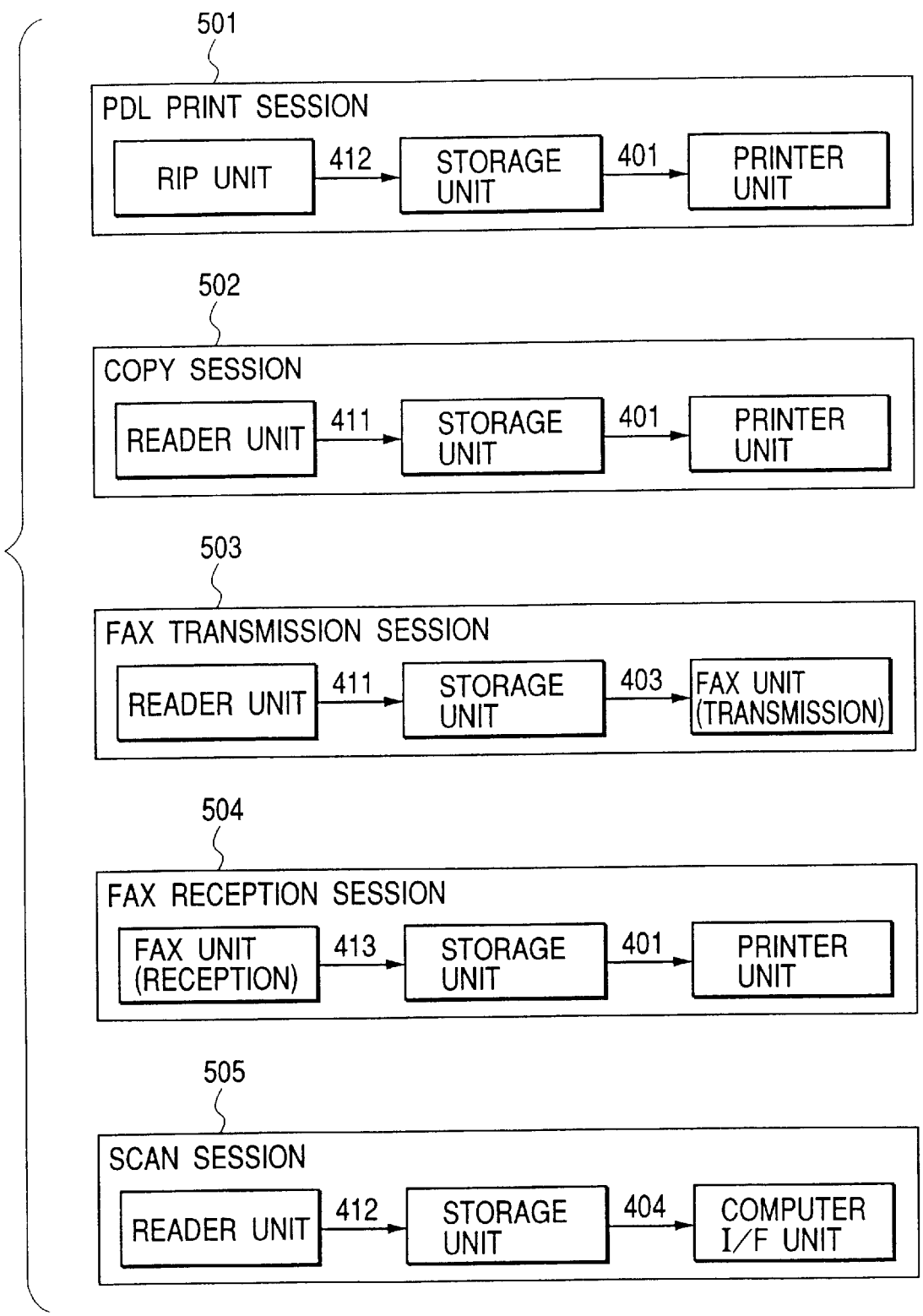
FIG. 5 is a view showing a structural example of sessions.

FIG. 5 shows an example of the unit (referred as session hereinafter) which is given by combining the plural jobs with others.

In FIG. 5, numeral 501 denotes a PDL print session in which the image input job 412 and the image output job 401 are combined with each other and controlled as the session. Numeral 502 denotes a copy session in which the image input job 411 and the image output job 401 are combined with each other and controlled as the session. Numeral 503 denotes a facsimile transmission session in which the image input job 411 and the image output job 403 are combined with each other and controlled as the session. Numeral 504 denotes a facsimile reception session in which the image input job 413 and the image output job 401 are combined with each other and controlled as the session. Numeral 505 denotes a scan session in which the image input job 411 and the image output job 404 are combined with each other and controlled as the session.

The session represents the unit of control which includes one or more job. Therefore, in addition to the example shown in FIG. 5, for example, the image input job 412 may be handled as one session, the image output job 401 may be handled as one session, or the combination of the image input job 412 and the image output jobs 401 and 403 may be handled as one session.

Figure 6:
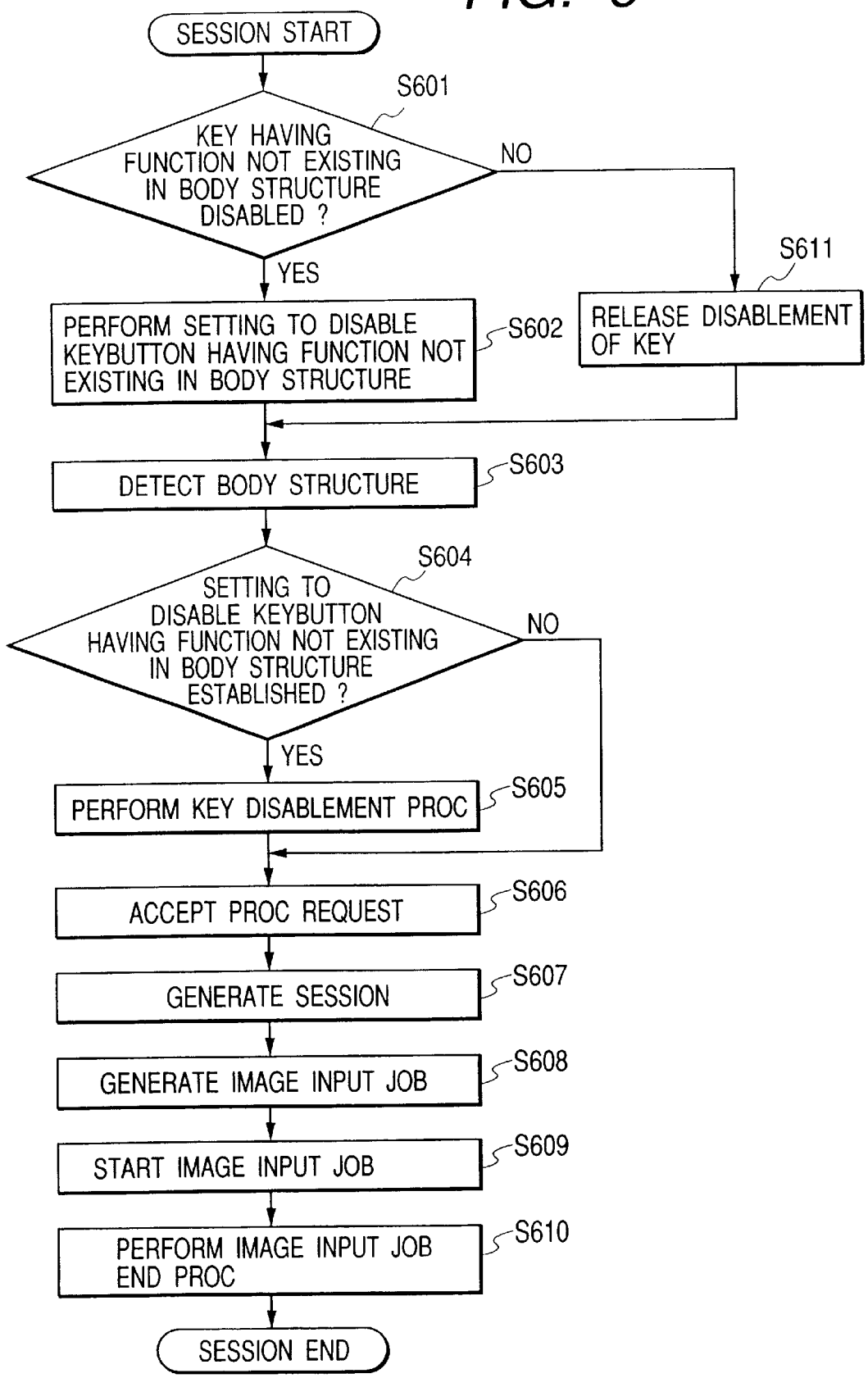
FIG. 6 is a flow chart showing an example of image input/output control.

FIG. 6 is a flow chart showing procedures of a session control task and an image input job control task to be executed by the CPU 123 in the core unit 10 of the image input/output control apparatus when the HD 6 normally operates. In FIG. 6, numerals S601, S602, S603, S604, S605, S606, S607, S608, S609, S610 and S611 respectively denote steps. Further, the session control task and the image input job control task are in multitasking relation.

As a first example of the session control task and the job control task, the control procedure of the image input job 412 constituting the PDL print session 501 of FIG. 5 will be explained with reference to FIG. 6.

First, in the step S601, it is judged based on a user's instruction whether or not an operation keybutton of the PS/WS 11 for the function currently not installed in the apparatus is to be disabled. If the operation keybutton is not disabled and it is newly instructed to disable the keybutton, setting to disable the corresponding keybutton is performed in the step S602. Thus, the setting is changed. Conversely, if the operation keybutton has been disabled and it is newly instructed to release the disablement of the keybutton, the disablement of the keybutton is released in the step S611, and then the flow advances to the step S603.

If there is no user's instruction to set or release the disablement of the keybutton, the flow advances to the step S603 with the previous setting.

In the step S603, a body structure of the apparatus is detected to obtain installation information of the currently installed input/output options (e.g., finisher 220, z folding unit 226, puncher 223, etc.). The obtained information concerning the body structure is recorded into a later-described job management table for managing the image input job.

In the step S604, it is judged whether or not the setting to disable the operation keybutton of the PS/WS 11 for the function currently not installed in the apparatus is performed. If judged that the setting is performed, the flow advances to the step S605 to perform the disablement processing. Conversely, if judged that the setting is not performed, the flow skips over the step S605 and advances to the step S606.

In the step S606, a print condition set by the user on the PC/WS 11 is accepted. The print condition to be set includes the number of pages, the number of prints, an original size, a sheet size, a magnification/reduction rate, one-face/two-face printing, a layout, page output order, a sort mode, stapling and the like. In this case, it is assumed that following print condition (i.e., parameters) has been set in an example.

the number of pages: 20 pages . . . (P1)
the number of prints: 10 prints . . . (P2)
one-face printing: yes . . . (P3)
original size: A4 . . . (P4)
sheet size: A4 . . . (P5)
magnification/reduction rate: 100% . . . (P6)
layout: no . . . (P7)
page output order: ascending order . . . (P8)
sort mode: yes . . . (P9)
stapling: yes . . . (P10)

Figure 9:
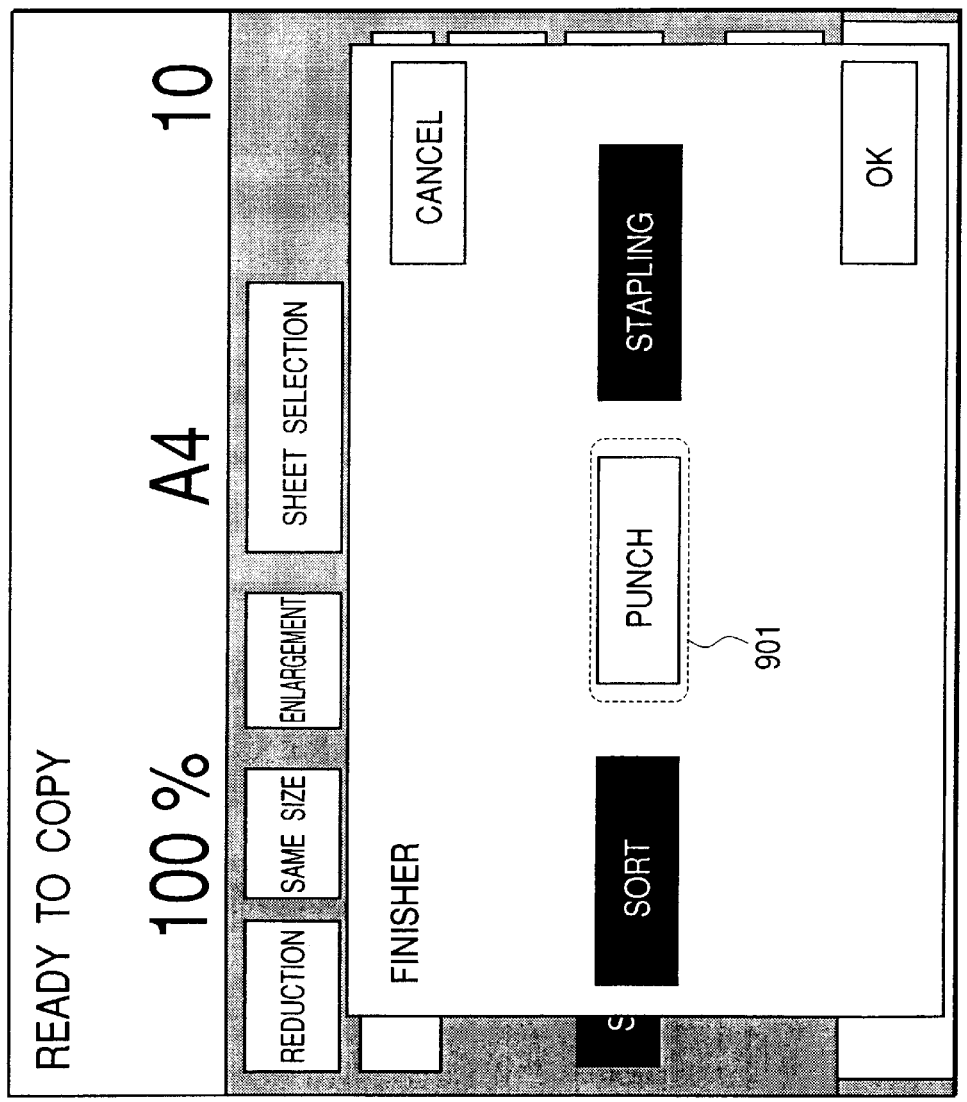
FIG. 9 is a view showing a display example on a touch panel of the operation unit.
Figure 10:
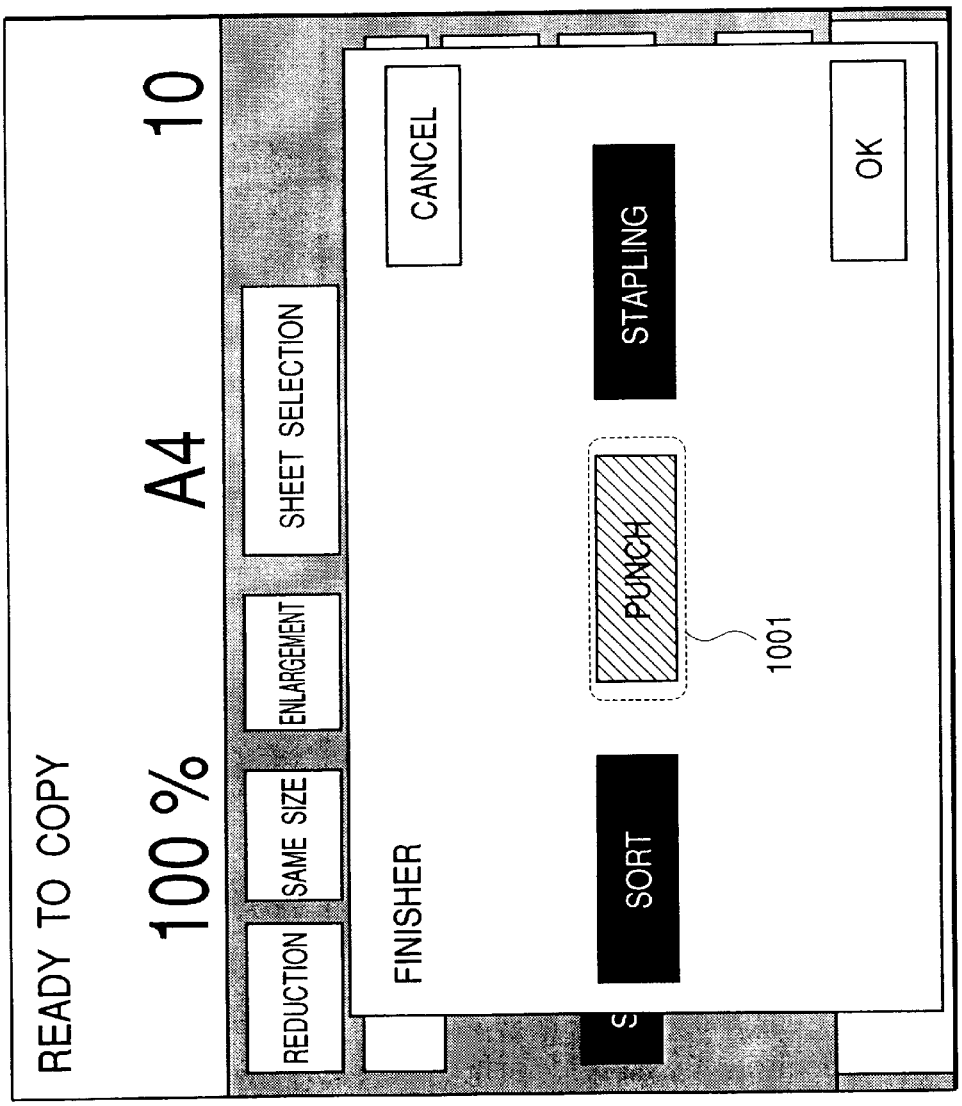
FIG. 10 is a view showing a display example on the touch panel of the operation unit.

Here, for example, it is assumed a case where the puncher 223 is not currently installed. In this case, if the disablement processing for the operation keybutton is performed in the step S605, the screen displayed on the display unit of the PC/WS 11 is as shown in FIG. 9. Conversely, if the disablement processing is not performed, the screen displayed is as shown in FIG. 10. Namely, in the state of FIG. 9, the enabled operation keybuttons are shown by the outline characters on the colored background. Therefore, since an operation keybutton 901 for instructing punching processing is not shown by the outline characters, this screen indicates the state that the operation keybutton 901 is disabled, whereby it is impossible to depress the keybutton 901. Conversely, in the state of FIG. 10, an operation keybutton 1001 is displayed at a slightly low density. This screen indicates the state that, even if the puncher 223 is not currently installed, the setting for the punching processing is possible by using the operation keybutton 1001.

In the explanation of this operation example, the setting not to disable the keybutton on the PC/WS 11 is performed whether the puncher 223 is currently installed. Therefore, it is assumed that the setting for the punching processing is performed on the screen shown in FIG. 10 whether the puncher 223 is currently installed.

For this reason, in addition to the above-described print parameters (P1) to (P10), a parameter (P11) indicating whether or not the punching processing is to be performed is set as follows.

punching: yes . . . (P11)

After the above-described print setting, the user issues a print instruction on the PC/WS 11. Simultaneously, target document data is converted into so-called PDL data by driver software installed in the PC/WS 11. Then the obtained PDL data, together with the print setting parameters (P1) to (P11), is transferred to the computer I/F unit 7 of the image input/output control apparatus through a computer interface connected to the PC/WS 11.

After the PDL data representing the image input through the computer I/F unit 7 is transferred to the data processing unit 121, the PDL data is transferred to the RIP unit 8 and sequentially expanded (or rasterized) into the image data. When the RIP unit 8 starts to receive the PDL data, the RIP unit 8 issues a processing request to the core unit 10, and the CPU 123 of the core unit 10 receives the issued processing request. Here the print setting parameters (P1) to (P11) set by the user are also transferred to the CPU 123.

In the step S607, the core unit 10 divides an image processing function of one unit according to the processing request from the RIP unit 8 into at least one image input job or one image output job. Then, in the core unit 10, the session constituted by the image input job or the image-output job is generated and managed. Namely, when the session is generated, the session management table is formed on the memory 124 to hold various information until the session ends.

Figure 11:
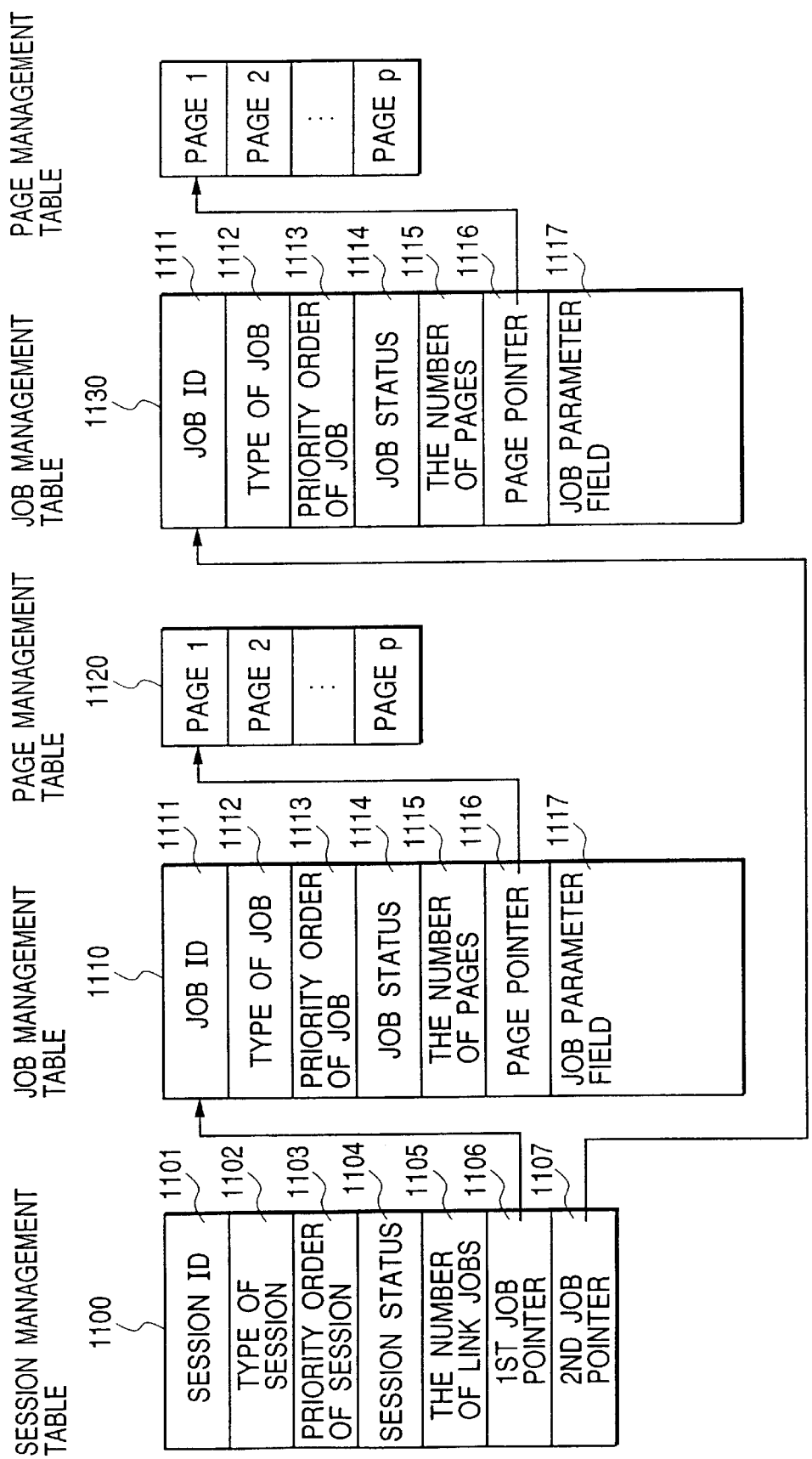
FIG. 11 is a view showing structures of a session management table, a job management table and a page management table.

FIG. 11 shows a session management table 1100. A session ID field 1101 is to generate a unique session ID in the image input/output control apparatus and hold it. A session type field 1102 is to specify a type of the generated session (PDL print session, copy session, facsimile transmission session, facsimile reception session, scan session or the like). In this operation example, the field 1102 specifies and records the PDL print session. A session priority order field 1103 is to hold priority of processing order of the session. A session status field 1104 is to hold an execution state of the session (executable state, execution state, interruption state, end state, error state, or the like) according to the state. A link job number field 1105 is to hold the number of the image input jobs and/or the image output jobs which together constitute the session. In this operation example, since the PDL print session 501 is constituted by the two jobs, i.e., the image input job 412 and the image output job 401, as shown in FIG. 5, the number "2" is set to the link job number field 1105. A first job pointer field 1106 is the pointer for a job management table 1110 of the image input job 412. A second job pointer field 1107 is the pointer for a job management table 1130 of the image output job 401. There are prepared the job pointer fields of which number corresponds to the number of jobs which together constitute the session. Also, there are formed the job management tables of which number corresponds to the number of jobs which together constitute the session.

In the step S608, the job management table 1110 of the image input job 412 shown in FIG. 11 is formed on the memory 124 to hold various information until the job ends.

In the job management table 1110, a job ID field 1111 is to generate a unique job ID in the image input/output control apparatus and hold it. A job type field 1112 is to specify a type of the generated job (above-described image input job and image output job). In this operation example, the job type field 1112 specifies and records the image input job 412 which is to sequentially record the image data expanded or decompressed by the RIP unit 8 into the storage unit 5. A job priority order field 1113 is to hold priority of job processing order. A job status field 1114 is to hold an execution state of the job (executable state, execution state, interruption state, end state, error state, or the like) according to the state. A page number field 1115 is to hold the number of pages of the job. A page pointer field 1116 is the pointer for a page management table 1120 in which detailed information of each page managed by the job has been written. The page management table 1120 is recorded on the HD 6.

A job parameter field 1117 is to hold various setting parameters of the job. In this operation example, the contents of the print setting parameters (P1) to (P11) accepted in the step S606 are held. Also, the apparatus information obtained in the step S603 is recorded into the job parameter field 1117.

After the job management table 1110 of the above-described image input job is formed, the session control task starts the image input job control task.

In the step S609, processing of the generated image input job (i.e., the image input job 412 in the PDL print session 501 in this operation example) starts. Namely, the session control task instructs the image input job control task to start the job.

When the image input job control task receives the job start instruction from the session control task, it starts the instructed job if another image input job is not performed and a new image input job is acceptable.

In the image input job 412 of the PDL print session 501 according to this operation example, the one-page image data expanded by the RIP unit 8 is first received. Namely, the image data is transferred from the RIP unit 8 to the data processing unit 121 through the I/F 120. The image data transferred to the data processing unit 121 is temporarily stored into the page memory 125. Further, the image data stored in the page memory 125 is recorded into the HD 6 of the storage unit 5. If the image data of all the pages expanded by the RIP unit 8 and to be processed is recorded into the HD 6, a job end notification of the image input job is transmitted to the session control task, and the image input job control task ends.

In the step S610, the session control task receives the job end notification from the image input job control task and performs end processing of the image input job. Namely, the job status (field) 1114 of the job management table 1110 of the image input job ends.

In the above-described example, it is explained the PDL print session 501 of FIG. 5 in which, according to the print setting by the PC/WS 11, the image information is transferred as the PDL data from the PC/WS 11, the PDL data is expanded into the image data by the image input/output control apparatus, and the obtained image data is print output. However, the above-described processing is also applicable to the copy session 502 of FIG. 5 in which the image information read by the reader unit 1 is print output.

Hereinafter, a second example of the session control and the job control of the image input/output control apparatus in the case-where the HD 6 normally operates will be explained with reference to FIG. 6. In this example, the control procedure of the image input job 411 which constitutes the session 502 of FIG. 5 will be explained. In this case, the image input job 411 is to sequentially record the image data read by the reader unit 1 into the storage unit 5.

First, in the step S601, it is judged whether or not an operation keybutton of the operation unit 9 for the function currently not installed in the apparatus is to be disabled. If the current setting is changed, the setting to disable the corresponding keybutton is performed in the step S602 or the setting to release the disablement of the keybutton in the step S611. Conversely, if the current setting is maintained, then the flow advances to the step S603. It should be noted that the instruction whether the operation keybutton is to be disabled is input by a predetermined keybutton operation in a service mode.

In the step S603, the body structure of the apparatus is detected to obtain installation information of the currently installed input/output options (e.g., finisher 220, Z folding unit 226, puncher 223, etc.). The obtained installation information is recorded into the job management table for managing the image input job.

In the step S604, it is judged whether or not the setting to disable the operation keybutton of the operation unit 9 for the function currently not installed in the apparatus is performed. If judged that the setting is performed, the flow advances to the step S605 to perform the disablement processing. Conversely, if judged that the setting is not performed, the flow skips over the step S605 and advances to the step S606.

In the step S606, a copy condition set by the user on the operation unit 9 is accepted.

Figure 8:
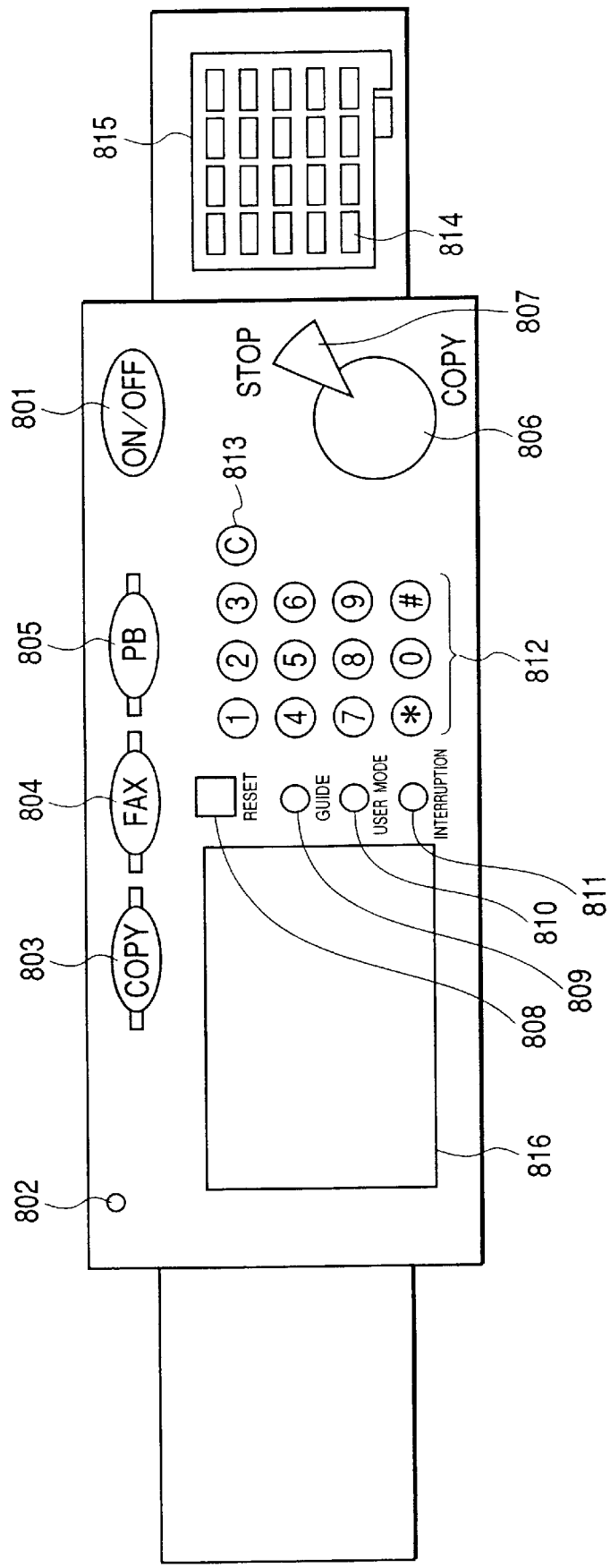
FIG. 8 is a view showing an operation unit.

FIG. 8 shows the appearance of the operation unit 9. In the drawing, numeral 801 denotes a power supply key, numeral 802 denotes a preheating key, numeral 803 denotes a copy function selection key, numeral 804 denotes a facsimile function selection key, numeral 805 denotes a personal box function selection key, numeral 806 denotes a start key, numeral 807 denotes a stop key, numeral 808 denotes a reset key, numeral 809 denotes an operation guidance key, numeral 810 denotes a user mode setting key, numeral 811 denotes an interruption copy key, numeral 812 denotes numeric keys, numeral 813 denotes a clear key, numeral 814 denotes a facsimile one-touch key, numeral 815 denotes a one-touch key changeable template, and numeral 816 denotes a touch panel. The setting contents for the copy operation are the number of copies, a sheet size, a magnification/reduction rate, one-face/two-face copy, a sort output mode, stapling and the like. The user inputs such parameters by using the numeric keys 812 and the setting items displayed on the touch panel 816. In this case, it is assumed that following parameters have been set in an example.

the number of copies: 10 copies . . . (C1)
one-face copy: yes . . . (C2)
sheet size: A4 . . . (C3)
magnification/reduction rate: 100% . . . (C4)
layout: no . . . (C5)
sort mode: yes . . . (C6)
stapling: yes . . . (C7)

Here, for example, it is assumed the case where the puncher 223 is not currently installed. In this case, if the disablement processing for the operation keybutton is performed in the step S605, the screen displayed on the touch panel 816 of the operation unit 9 of the image input/output control unit 3 is as shown in FIG. 9. Conversely, if the disablement processing is not performed, the screen displayed is as shown in FIG. 10. Namely, in the state of FIG. 9, the enabled operation keybuttons are shown by the outline characters on the colored background. Therefore, since the operation keybutton 901 for instructing the punching processing is not shown by the outline characters, this screen indicates the state that the operation keybutton 901 is disabled, whereby it is impossible to depress the keybutton 901. Conversely, in the state of FIG. 10, the operation keybutton 1001 is displayed at the slightly low density. This screen indicates the state that, even if the puncher 223 is not currently installed, the setting for the punching processing is possible by using the operation keybutton 1001.

In the explanation of this operation example, the setting not to disable the keybutton on the operation unit 9 is performed whether the puncher 223 is currently installed. Therefore, it is assumed that the setting for the punching processing is performed on the screen shown in FIG. 10 whether the puncher 223 is currently installed.

For this reason, in addition to the above-described copy parameters (C1) to (C7), a parameter (C8) indicating whether or not the punching processing is to be performed is set as follows.

punching: yes . . . (C8)

After the above-described copy setting, the user puts the original on the reader unit 1 and depresses the start key 806 to issue a copy instruction. The operation unit 9 transfers the set parameters (C11) to (C8) to the CPU 123 of the core unit 10 to issue a processing request.

In the step S607, the core unit 10 divides an image processing function of one unit according to the processing request from the operation unit 9 into at least one image input job or one image output job. Then, in the core unit 10, the session constituted by the image input job or the image output job is generated and managed on the above-described session management table 1100 shown in FIG. 11 to hold the various information until the session ends.

In the session management table 1100, the session ID field 1101 is to generate a unique session ID in the image input/output control apparatus and hold it. The session type field 1102 is to specify a type of the generated session (PDL print session, copy session, facsimile transmission session, facsimile reception session, scan session, or the like). In this operation example, the field 1102 specifies and records the PDL print session. The session priority order field 1103 is to hold priority of processing order of the session. The session status field 1104 is to hold an execution state of the session (executable state, execution state, interruption state, end state, error state, or the like) according to the state. The link job number field 1105 is to hold the number of the image input jobs and/or the image output jobs which together constitute the session. In this operation example, since the PDL print session 501 is constituted by the two jobs, i.e., the image input job 411 and the image output job 401, as shown in FIG. 5, the number "2" is set to the link job number field 1105. The first job pointer field 1106 is the pointer for the job management table 1110 of the image input job 411. The second job pointer field 1107 is the pointer for the job management table 1130 of the image output job 401.

In the step S608, the job management table 1110 of the image input job 411 is formed on the memory 124 to hold the various information until the job ends.

In the job management table 1110, the job ID field 1111 is to generate a unique job ID in the image input/output control apparatus and hold it. The job type field 1112 is to specify a type of the generated job (above-described image input job and image output job). In this operation example, the job type field 1112 specifies and records the image input job 411 which is to sequentially record the image data read by the reader unit 1 into the storage unit 5. The job priority order field 1113 is to hold priority of job processing order. The job status field 1114 is to hold an execution state of the job (executable state, execution state, interruption state, end state, error state, or the like) according to the state. The page number field 1115 is to hold the number of pages of the job. The page pointer field 1116 is the pointer for the page management table 1120 in which detailed information of each page managed by the job has been written. The page management table 1120 is recorded on the HD 6.

The job parameter field 1117 is to hold various setting parameters of the job. In this operation example, the contents of the copy setting parameters (C1) to (C8) accepted in the step S606 are held. Also, the apparatus information obtained in the step S603 is recorded into the job parameter field 1117.

After the job management table 1110 of the image input job is formed, the session control task starts the image input job control task.

In the step S609, processing of the generated image input job (i.e., the image input job 411 in the copy session 502 in this operation example) starts. Namely, the session control task instructs the image input job control task to start the job.

When the image input job control task receives the job start instruction from the session control task, it starts the instructed job if the reader unit 1 is not used by another image input job and a new image input job is acceptable.

In the image input job 411 of the copy session 502 according to this operation example, the one-page image data read by the reader unit 1 is first received. Namely, the image data is transferred from the reader unit 1 to the data processing unit 121 through the I/F 120. The image data transferred to the data processing unit 121 is temporarily stored into the page memory 125. Further, the image data temporarily stored in the page memory 125 is further recorded into the HD 6 of the storage unit 5.

Then it is judged whether or not the image data of all the pages read by the reader unit 1 and to be processed is recorded into the HD 6. If judged that the page not processed remains, the processing continues. Conversely, if judged that all the pages have been processed, a job end notification of the image input job is transmitted to the session control task, and the image input job control task ends.

In the step S607, the session control task receives the job end notification from the image input job control task and performs the end processing of the image input job. Namely, the job status (field) 1114 of the job management table 1110 of the image input job ends.

Figure 7:
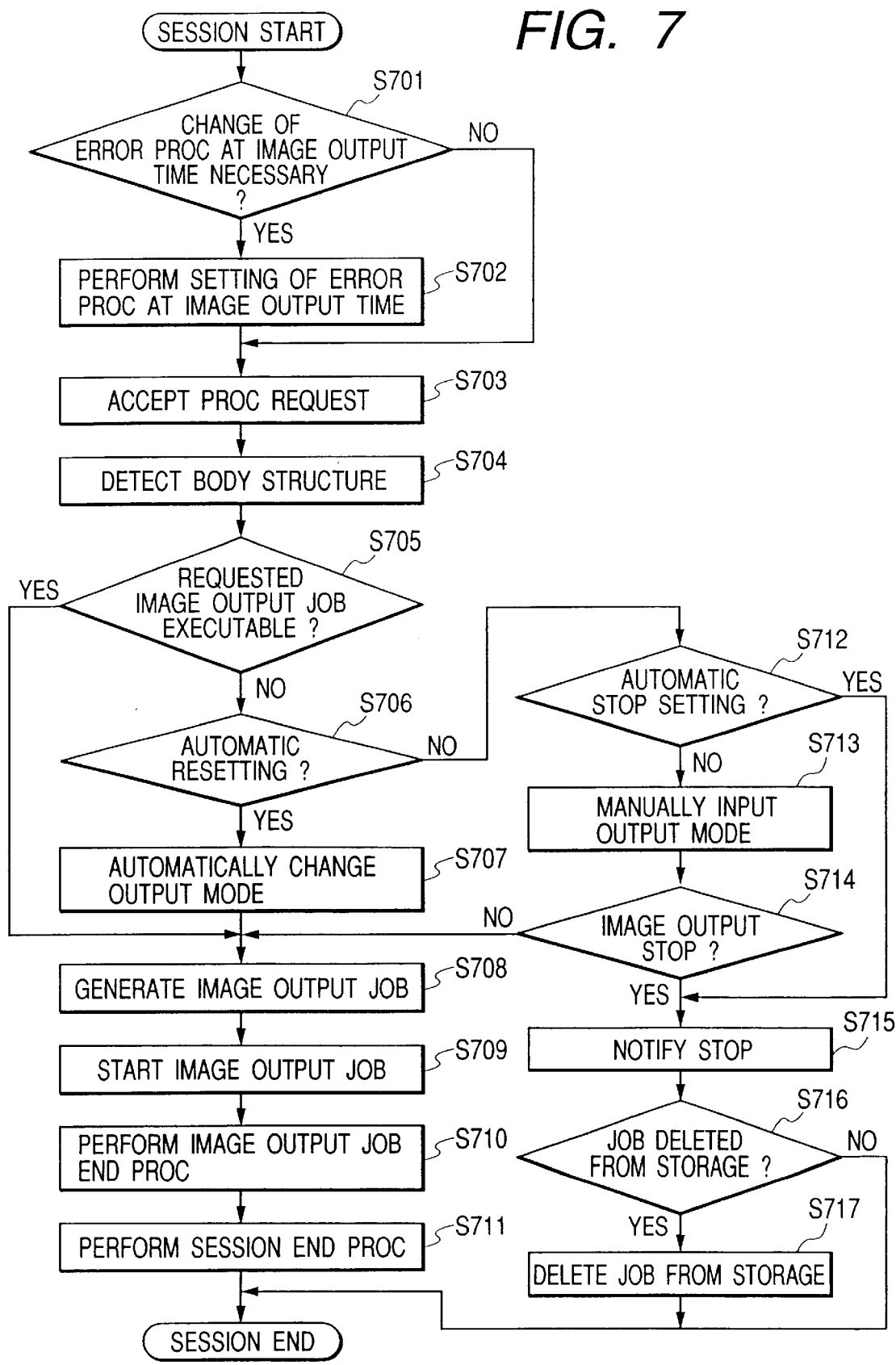
FIG. 7 is a flow chart showing an example of image input/output control.

FIG. 7 is a flow chart showing procedures of the session control task and an image output job control task to be executed by the CPU 123 in the core unit 10 of the image input/output control apparatus in the present embodiment. Namely, FIG. 7 shows the control procedure of the image output job 401 which sequentially outputs the image data stored in the HD 6 of the storage unit 5 to the printer unit 2 in accordance with the image input job control task explained in FIG. 6. In FIG. 7, numerals S701, S702, S703, S704, S705, S706, S707, S708, S709, S710, S711, S712, S713, S714, S715, S716 and S717 respectively denote steps. Further, the session control task and the image output job control task are in multitasking relation.

First, in the step S701, if the option (e.g., finisher 220, Z folding unit 226, puncher 223, or the like) to perform the print processing designated by the print parameters and the copy parameters accepted in the above-described image input job control task does not currently exist in the apparatus, it is judged whether or not it is necessary to change the setting of the method to cope with such a state. As items capable of being set in this method, if there is no desired apparatus structure, following three modes are available:

(1) to change a current mode to an automatically executable image output mode, and perform image output;

(2) to automatically stop image output; and (3) to wait for a user's manual operation from the operation unit.

The user exclusively selects either of these three modes on the operation unit 9 of the image input/output control unit 3.

If judged in the step S701 that it is necessary to change the setting of the method, the flow advances to the step S702 to recognize the mode of the method selected by the user and perform the mode setting. In this case, if the setting of the mode (2) is to be performed, also the setting whether the corresponding job is to be deleted from the storage unit 5 is performed.

Conversely, if judged in the step S701 that it is unnecessary to change the initial setting of the method, the flow skips over the step S702 and advances to the step S703. In the step S703, the request of the image output job (i.e., image printing) from the session control task is received. Since the image output processing is asynchronous with the above-described image data input processing, it is possible to receive the request immediately after the image data input processing is performed, during the image data input processing, or after a certain time passes from the end of the image data input processing.

In the step S704, the body structure of the apparatus is detected to obtain installation information of the currently installed input/output options (e.g., finisher 220, Z folding unit 226, puncher 223, etc.).

In the step S705, on the basis of the installation information obtained in the step S704 and the installation information recorded in the job management table at the image input time, it is judged whether or not the body structure at the image input time is different from that at the present time. Further, on the basis of the judged result, it is judged whether the image output according to the method designated for the requested image output job is possible or impossible by the current installation. If judged that the image output is possible, then the image output processing in the step S708 and the subsequent steps is performed. Conversely, if judged that the image output is impossible, the flow advances to the step S708 to determine what kind of processing is to be performed and perform the determined processing.

If judged in the step S705 that the image output according to the method designated for the requested image output job is impossible by the current installation, the flow advances to the step S706. If the mode previously set in the step S702 is "to change the current mode to the automatically executable image output mode, and perform image output", the flow advances to the step S707. Then, optimum setting for the desired setting is searched from the current body structure, and resetting of the output mode (i.e., the print parameters or the copy parameters) is automatically performed. For example, in the above-described image input job, if the punching processing has been designated and the puncher 223 currently exists as the apparatus structure, the image output job as being requested is performed without question. However, if the puncher 223 is not installed, the parameter to discharge the sheet without punching is automatically set as a substitute, and the image output is performed.

In the step S708, the session control task forms the job management table 1130 of the image output job 401 shown in FIG. 11 on the memory 124, in the same manner as in case of the job management table 1110 of the image input job 412, so as to hold various information until the job ends.

In the present embodiment, the print parameters (P1) to (P11) or the copy parameters (C1) to (C8) such as the number of prints or copies, the sheet size, the magnification/reduction rate, the one-face/two-face copy, the page output order, the sort output mode, the stapling and the like accepted in the step S606 are held. If some substitutes are selected in the step S707 or in the later-described step S713, also the information concerning the selected substitute is held. After the session control task forms the job management table of the image output job, it starts the image output job control task.

In the step S709, processing of the generated image output job 401 starts. Namely, the session control task instructs the image output job control task to start the job.

When the image output job control task receives the job start instruction from the session control task, it starts the instructed job if the printer unit 2 is not used by another job and there is the state that a new print can start.

Namely, the image data for each page recorded in the HD 6 is sequentially read and transferred to the data processing unit 121 through the I/F 120. The data processing unit 121 holds the transferred one-page image data on the image memory 125, and the image data held on the image memory 125 is then transferred to the printer unit 2 through the I/F 122. The printer unit 2 performs the image formation according to the print parameters (P1) to (P11) or the copy parameters (C1) to (C8), and prints out the formed image.

Then it is judged whether or not the image data for each page recorded in the HD 6 and concerning the designated job is completely printed out. If judged that the page not processed remains, the processing continues. Conversely, if judged that all the pages have been processed desired times, a job end notification of the image output job is transmitted to the session control task, and the image output job control task ends.

In the step S710, the session control task receives the job end notification from the image output job control task and performs the end processing of the image output job. Namely, the job status (field) of the job management table of the image output job ends.

In the step S711, the end processing of the session generated in the image input processing is performed. Namely, the job management tables of the image input job and the image output job and the image data for each page in the page management table are cancelled to release the resources. Also, the session management table is cancelled to release the resources, and the serial processing ends.

Conversely, if judged in the step S705 that the image output according to the method designated for the requested image output job is impossible by the current installation, and if judged in the step S706 that the mode previously set in the step S702 is not "to change the current mode to the automatically executable image output mode, and perform image output", the flow advances to the step S712.

In the step S712, it is judged whether or not the mode previously set in the step S702 is "to automatically stop the image output". If judged that the mode is "to automatically stop the image output", the flow advances to the step S715 to notify the processing stop, and the session ends.

If it is judged that the mode previously set in the step S702 is "to wait for the user's manual operation from the operation unit", the flow advances to the step S713 to request the user to change the setting of the apparatus to be used. Namely, since the operation unit 9 of the image input/output control unit 3 displays that it is necessary to change the setting of the apparatus, the user changes the setting of the print parameters (P1) to (P11) or the copy parameters (C1) to (C8) on the operation unit 9 of the image input/output control unit 3 in accordance with the displayed request. At this time, like FIG. 9, the keybuttons which are disposed on the PC/WS 11 and the operation unit 9 and correspond to the functions unusable in the current body structure are disabled to inhibit the setting of the apparatus incapable of performing the output. Further, in the manual setting in the step S713, it is possible to designate afresh the processing stop and whether or not the job is to be deleted from the storage unit 5 in case of the processing stop.

In the step S714, it is judged whether or not the setting designated in the step S713 is the processing stop. If judged that the setting is not to stop the processing, the flow advances to the step S708. In this step, like the case where the previously set mode is "to change the current mode to the automatically executable image output mode, and perform image output", the session control task forms the job management table 1130 of the image output job 401 shown in FIG. 11 on the memory 124. Then, the processing of the generated image output job 401 starts. It should be noted that, in the memory 124, the areas for storing the above-described session management table and the job management table are nonvolatile.

Conversely, if judged in the step S714 that the setting designated in the step S713 is to stop the processing, the flow advances to the step S715. In this step, on the basis of the judgment that the set mode in the step S712 is "to automatically stop the image output", or in accordance with the user's input in the step S713, the operation unit 9 of the image input/output control unit 3 displays that the image output processing is stopped, to notify the user of such the fact.

In the step S716, it is judged whether or not the stopped job is to be deleted on the storage unit 5. Namely, if the mode "to automatically stop the image output" is selected in the step S702, then it is further judged whether or not it has been designated "to delete the job from the storage if the image output is automatically stopped". If judged that it has been designated to delete the job, the flow advances to the step S717 to delete the job from the storage unit 5.

If it is selected in the step S702 "to wait for the user's manual operation from the operation unit", if it is instructed from the user in the step S713 to stop the image output, and if it is also designated in the step S713 to delete the job in the storage unit 5, also the flow advances to the step S717 to delete the job from the storage unit 5.

If it is judged in the step S716 not to delete the job, the processing is stopped as it is, and the flow waits for a new processing request for the job.

In the above-described examples, the case where the image input/output processing is performed through the HD 6 of the storage unit 5 has been explained. However, it is needless to say that the present invention is similarly applicable to a case where the image input/output processing is performed without using the HD 6 but with use of, e.g., a part of the page memory 125 of the data processing unit 121.

Further, the option which is used in the print processing being the object of the above-described control is not limited to the finisher, the Z folding unit, the puncher or the like used in the present embodiment. For example, it is needless to say that the above-described control is also applicable to other option equipments such as a two-face processing unit which is used to invert the recording sheet and keep it waiting for two-face printing, a sorter which sorts the recording sheet, or the like. Further, the present invention is also applicable to an internal structure which is different from the option such as the finisher or the like in the present embodiment.

As explained above, even if the body structure at the image input time is different from that at the image output time, it is possible to select one of the three methods to cope with such the case, i.e., the method to change the means to the automatically executable image output means without generating the error to stop the processing, the method to stop the image output processing, and the method to wait for the user's operation from the operation unit to continue the processing, whereby the apparatus can be effectively used. Further, when the image is input, the apparatus which is not installed at this time is disabled to inhibit the setting from the operation unit, or conversely the job which uses the function of the apparatus which is scheduled to be installed in the future but is not currently installed can be submitted, whereby it is possible to perform the job which is suitable for the apparatus structure.

Although the present invention has been explained by using the preferred embodiment, the present invention is not limited to the structure of this embodiment. Namely, it is needless to say that various modifications and changes are possible in the present invention without departing from the spirit and scope of the appended claims.

What is claimed is:

1. An image input/output apparatus comprising:
   input means for inputting image data from at least one image input unit;
   storage means for storing the image data input by said input means;
   output means for outputting the image data stored in said storage means to at least one image output unit;
   setting means for setting an image processing content to be performed by said image output unit when the image data is input by said input means;
   detection means for detecting a structure of said image output unit;
   restriction means for restricting the image processing content capable of being set by said setting means, in accordance with the detection output of said detection means; and
   selection means for previously selecting whether or not the setting restriction of the image processing content is to be performed by said restriction means.

2. An apparatus according to claim 1, wherein said selection means selects either of a first mode to enable setting of an image processing condition concerning a structure not detected by said detection means, or a second mode to inhibit the setting of the image processing condition concerning the structure not detected by said detection means.

3. An apparatus according to claim 1, wherein said setting means comprises display means for displaying the setting-capable image processing content and instruction means for instructing the image processing content displayed by said display means, and said restriction means restricts the image processing content displayed by said display means and the image processing content capable of being instructed by said instruction means.

4. An apparatus according to claim 1, wherein said detection means detects whether or not a detachable structure is currently installed in said image output unit.

5. An image input/output apparatus comprising:
   input means for inputting image data from at least one image input unit;
   storage means for storing the image data input by said input means;
   output means for outputting the image data stored in said storage means to at least one image output unit;
   setting means for setting an image processing content to be performed by said image output unit when the image data is input by said input means;
   detection means for detecting a structure of said image output unit when the image data is output by said output means; and
   judgment means for judging whether the image processing content set by said setting means is practicable or nonpracticable, according to the detection output of said detection means,
   wherein, when it is judged by said judgment means that the image processing content set by said setting means is nonpracticable, said image input/output apparatus operates in a first mode to stop the image processing of the image processing content judged to be nonpracticable, and in a second mode to change the image processing content judged to be nonpracticable to another image processing content and then perform the image processing.

6. An apparatus according to claim 5, further comprising selection means for selecting whether said image input/output apparatus is to operate in said first mode or in said second mode.

7. An apparatus according to claim 5, wherein said second mode includes an automatic mode to automatically change the image processing content judged to be nonpracticable to another image processing content, and a manual mode to change the image processing content judged to be nonpracticable to another image processing content according to an instruction of a user.

8. An apparatus according to claim 7, further comprising selection means for selecting either of said automatic mode or said manual mode.

9. An apparatus according to claim 5, wherein said detection means detects whether or not a detachable structure is currently installed in said image output unit.

10. An image input/output method for an image input/output apparatus which inputs image data from at least one image input unit, stores the input image data into storage means, and outputs the image data stored in the storage means to at least one image output unit, said method comprising:

a detection step of detecting a structure of the image output unit when the image data is input from the image input unit;

a setting step of setting an image processing content to be performed by the image output unit when the image data is input from the image input unit;

a restriction step of restricting the image processing content capable of being set in said setting step, in accordance with the detection output of said detection step; and a selection step of previously selecting whether or not the setting restriction of the image processing content is to be performed in said restriction step.

11. A method according to claim 10, wherein said selection step selects either of a first mode to enable setting of an image processing condition concerning a structure not detected in said detection step, or a second mode to inhibit the setting of the image processing condition concerning the structure not detected in said detection step.

12. A method according to claim 10, further comprising:

a display step of displaying the setting-capable image processing content; and an instruction step of instructing the image processing content displayed in said display step, and wherein said restriction step restricts the image processing content displayed in said display step and the image processing content capable of being instructed in said instruction step.

13. A method according to claim 10, wherein said detection step detects whether or not a detachable structure is currently installed in the image output unit.

14. An image input/output method for an image input/output apparatus which inputs image data from at least one image input unit, stores the input image data into storage means, and outputs the image data stored in the storage means to at least one image output unit, said method comprising:

a setting step of setting an image processing content to be performed by the image output unit when the image data is input from the image input unit;

a detection step of detecting a structure of the image output unit when the image data is output to the image output unit; and a judgment step of judging whether the image processing content set in said setting step is practicable or nonpracticable, according to the detection output of said detection step, wherein, when it is judged in said judgment step that the image processing content set in said setting step is nonpracticable, the image input/output apparatus operates in a first mode to stop the image processing of the image processing content judged to be nonpracticable, and in a second mode to change the image processing content judged to be nonpracticable to another image processing content and then perform the image processing.

15. A method according to claim 14, further comprising a selection step of selecting whether the image input/output apparatus is to operate in said first mode or in said second mode.

16. A method according to claim 14, wherein said second mode includes an automatic mode to automatically change the image processing content judged to be nonpracticable to another image processing content, and a manual mode to change the image processing content judged to be nonpracticable to another image processing content according to an instruction of a user.

17. A method according to claim 16, further comprising a selection step of selecting either of said automatic mode or said manual mode.

18. A method according to claim 17, further comprising a step of selecting either of said first mode or said second mode.

19. A method according to claim 14, wherein said detection step detects whether or not a detachable structure is currently installed in the image output unit.

20. An image processing system which stores image data input from at least one image input means into storage means, and outputs the image data stored in said storage means to at least one image output means, said system comprising:

setting means for setting an image processing content to be performed by said image output means when the image data is input from said image input means;

detection means for detecting a structure of said image output means;

restriction means for restricting the image processing content capable of being set by said setting means, in accordance with the detection output of said detection means; and selection means for previously selecting whether or not the setting restriction of the image processing content is to be performed by said restriction means.

21. A system according to claim 20, wherein said selection means selects either of a first mode to enable setting of an image processing condition concerning a structure not detected by said detection means, or a second mode to inhibit the setting of the image processing condition concerning the structure not detected by said detection means.

22. A system according to claim 20, wherein said setting means comprises display means for displaying the setting-capable image processing content and instruction means for instructing the image processing content displayed by said display means, and said restriction means restricts the image processing content displayed by said display means and the image processing content capable of being instructed by said instruction means.

23. A system according to claim 20, wherein said detection means detects whether or not a detachable structure is currently installed in said image output means.

24. An image processing system which stores image data input from at least one image input means into storage means, and outputs the image data stored in said storage means to at least one image output means, said system comprising:

setting means for setting an image processing content to be performed by said image output means when the image data is input from said input means;

detection means for detecting a structure of said image output means when the image data is output to said output means; and judgment means for judging whether the image processing content set by said setting means is practicable or nonpracticable, according to the detection output of said detection means, wherein, when it is judged by said judgment means that the image processing content set by said setting means is nonpracticable, said image processing system operates in a first mode to stop the image processing of the image processing content judged to be nonpracticable, and in a second mode to change the image processing content judged to be nonpracticable to another image processing content and then perform the image processing.

25. A system according to claim 24, further comprising selection means for selecting whether said image processing system is to operate in said first mode or in said second mode.

26. A system according to claim 24, wherein said second mode includes an automatic mode to automatically change the image processing content judged to be nonpracticable to another image processing content, and a manual mode to change the image processing content judged to be nonpracticable to another image processing content according to an instruction of a user.

27. A system according to claim 26, further comprising selection means for selecting either of said automatic mode or said manual mode.

28. A system according to claim 24, wherein said detection means detects whether or not a detachable structure is currently installed in said image output means.

* * * * *

UNITED STATES PATENT AND TRADEMARK OFFICE
CERTIFICATE OF CORRECTION

PATENT NO. : 6,661,527 B1
DATED : December 9, 2003
INVENTOR(S) : Kouki Shibao

It is certified that error appears in the above-identified patent and that said Letters Patent is hereby corrected as shown below:

Column 4,
Line 27, "Object" should read -- object --, "Features" should read -- features -- and "Present" should read -- present --.

Column 8,
Line 59, "z folding" should read -- Z folding --.

Column 12,
Line 66, "parameters (C11)" should read -- parameters (C1) --.

Signed and Sealed this

Tenth Day of August, 2004

JON W. DUDAS
*Acting Director of the United States Patent and Trademark Office*